United States Patent
Line et al.

(10) Patent No.: US 11,572,642 B2
(45) Date of Patent: Feb. 7, 2023

(54) UPPER FOR AN ARTICLE OF FOOTWEAR HAVING TWO YARN TYPES

(71) Applicant: NIKE, Inc., Beaverton, OR (US)

(72) Inventors: Ashleigh S. Line, Portland, OR (US); Nicolino Matteo, Hillsboro, OR (US); Juan L. Aceves Tinajero, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/144,368

(22) Filed: Jan. 8, 2021

(65) Prior Publication Data

US 2021/0219661 A1    Jul. 22, 2021

Related U.S. Application Data

(60) Provisional application No. 62/958,493, filed on Jan. 8, 2020.

(51) Int. Cl.
*D04B 1/24*    (2006.01)
*A43B 1/04*    (2022.01)
*D04B 1/16*    (2006.01)

(52) U.S. Cl.
CPC ............... *D04B 1/24* (2013.01); *A43B 1/04* (2013.01); *D04B 1/16* (2013.01); *D10B 2331/04* (2013.01); *D10B 2501/043* (2013.01)

(58) Field of Classification Search
CPC .... D04B 1/24; D04B 1/16; D04B 1/22; A43B 1/04; D10B 2501/043
See application file for complete search history.

(56) References Cited

U.S. PATENT DOCUMENTS

| | | | |
|---|---|---|---|
| 2018/0042333 | A1 | 2/2018 | Manos-gully et al. |
| 2018/0132558 | A1* | 5/2018 | Berrian ............... A43B 23/042 |
| 2018/0317594 | A1 | 11/2018 | Brinkman et al. |
| 2019/0274392 | A1 | 9/2019 | Amis et al. |
| 2019/0328075 | A1* | 10/2019 | Poulsen ............. A43B 23/0235 |

(Continued)

FOREIGN PATENT DOCUMENTS

WO    2019/147981 A1    8/2019

OTHER PUBLICATIONS

International Search Report and Written Opinion for PCT application No. PCT/US2021/012688, dated Apr. 21, 2021, 13 pages.

(Continued)

*Primary Examiner* — Danny Worrell
(74) *Attorney, Agent, or Firm* — Shook Hardy & Bacon L.L.P.

(57) ABSTRACT

An upper for an article of footwear may include a first area and a second area. The first area may be located on at least one of a lateral and a medial side of the upper, where the first area includes a plurality of first knit courses, and at least a majority of the first knit courses are at least partially formed by a first yarn. The second area may be located adjacent to the first area, where the second area extends through at least one of a lateral side and a medial side of a throat area of the upper. The second area may include a plurality of second knit courses and at least a majority of the second knit courses are formed by a second yarn. The second yarn may have a tenacity of at least 5 g/D. The first yarn may have a tenacity of less than 5 g/D, in some embodiments.

20 Claims, 6 Drawing Sheets

(56) References Cited

U.S. PATENT DOCUMENTS

2020/0046074 A1* 2/2020 Berrian .................... D04B 1/10
2020/0046078 A1 2/2020 Durrell et al.

OTHER PUBLICATIONS

International Preliminary Report on Patentability received for PCT Patent Application No. PCT/US2021/012688, dated Jul. 21, 2022, 9 pages.

* cited by examiner

UPPER FOR AN ARTICLE OF FOOTWEAR HAVING TWO YARN TYPES

RELATED APPLICATION

This application claims the benefit of U.S. Provisional Patent Application No. 62/958,493, filed Jan. 8, 2020, which is incorporated by reference herein in its entirety.

BACKGROUND

Conventional articles of footwear generally include two primary elements: an upper and a sole structure. The upper is generally secured to the sole structure and may form a void within the article of footwear for comfortably and securely receiving a foot. The sole structure is generally secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and may form a ground-engaging portion of the sole structure that is formed from a durable and wear-resistant material.

The upper of the article of footwear generally extends over the instep and toe areas of the foot, along the medial and lateral sides of the foot, and around the heel area of the foot and in some instances under the foot. Access to the void in the interior of the upper is generally provided by an ankle opening in and/or adjacent to a heel region of the footwear. A lacing system is often incorporated into the upper to adjust the fit of the upper, thereby facilitating entry and removal of the foot from the void within the upper. In addition, the upper may include a tongue that extends under the lacing system to enhance adjustability of the footwear, and the upper may incorporate other structures such as, for example, a heel counter to provide support and limit movement of the heel.

BRIEF DESCRIPTION OF THE DRAWINGS

The embodiments of the present disclosure may be better understood with reference to the following drawings and description. The components in the figures are not necessarily to scale, with emphasis instead being placed upon illustrating the principles of the present disclosure. Moreover, in the figures, like referenced numerals designate similar or identical features.

DETAILED DESCRIPTION

Figure 1:
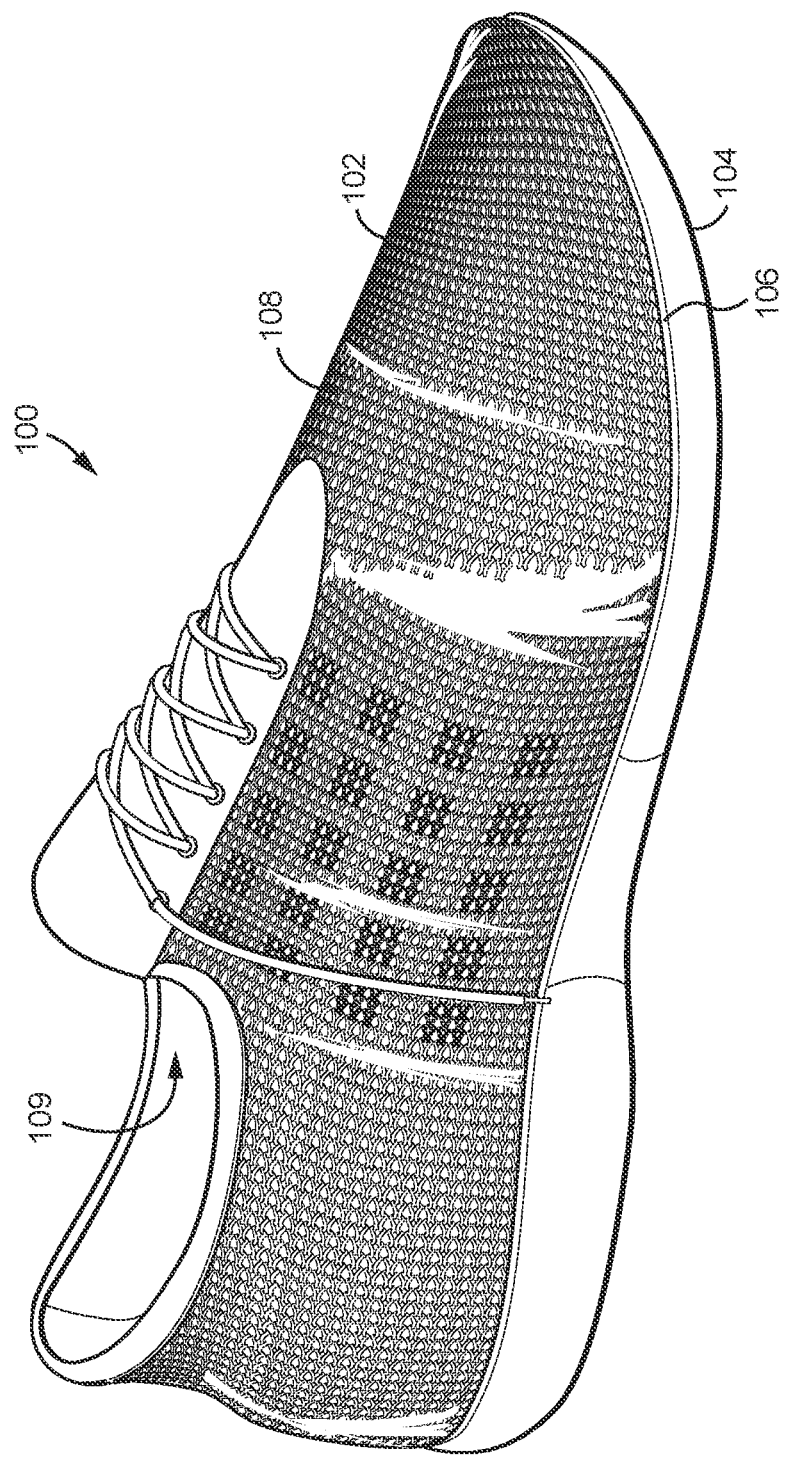
FIG. 1 is an illustration showing a lateral side of an article of footwear having a stretch resistance system in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to uppers configured for use in an article of footwear and/or other articles, such as articles of apparel. When referring to articles of footwear, the disclosure may describe basketball shoes, running shoes, biking shoes, cross-training shoes, football shoes, golf shoes, hiking shoes and boots, ski and snowboarding boots, soccer shoes, tennis shoes, and/or walking shoes, as well as footwear styles generally considered non-athletic, including but not limited to dress shoes, loafers, and sandals.

Figure 2:
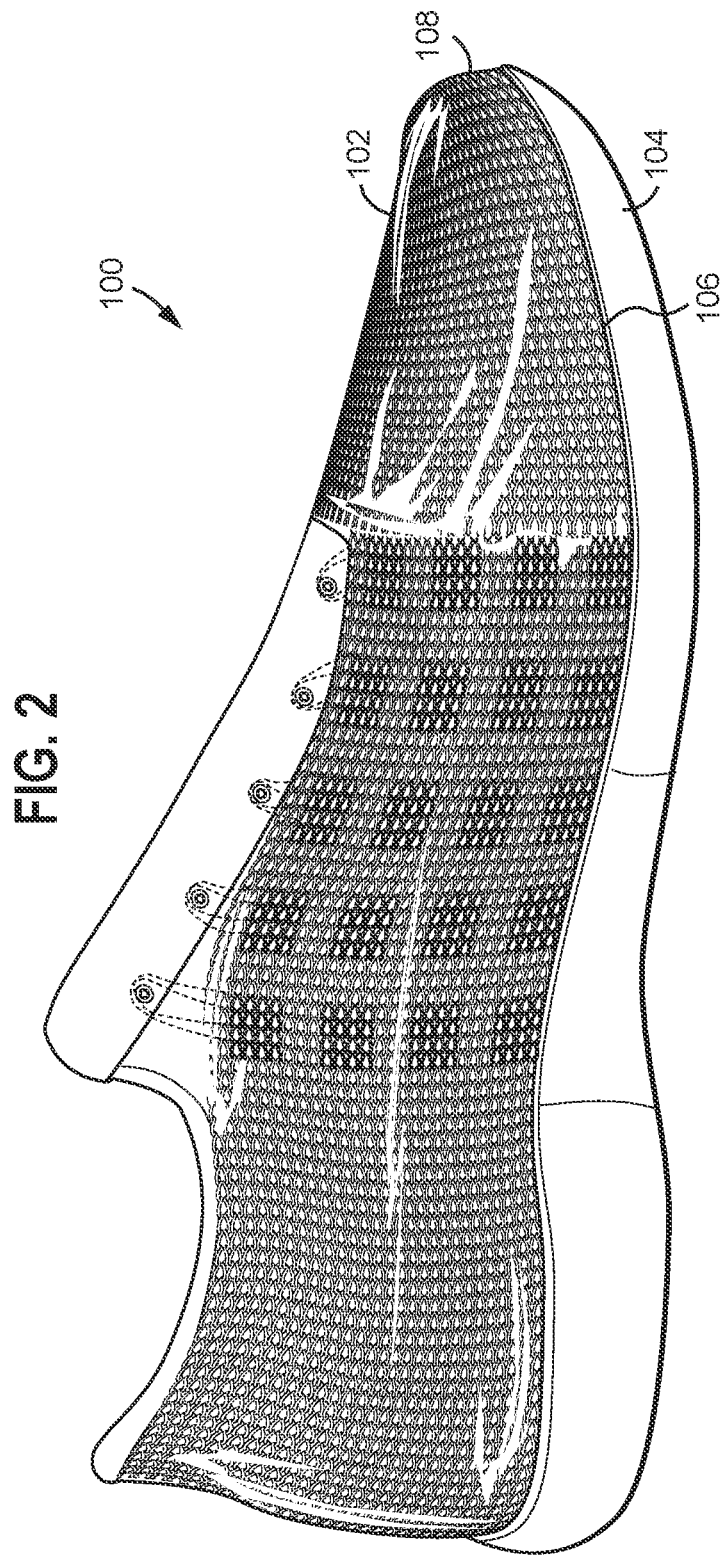
FIG. 2 is an illustration showing a medial side of the article of footwear of FIG. 1 in accordance with certain aspects of the present disclosure.

FIGS. 1-2 are illustrations showing an example of an article of footwear 100 having an upper 102 that is secured to a sole structure 104. The area where the sole structure 104 joins the upper 102 may be referred to as a biteline 106. The upper 102 may be at least partially formed by a knitted component 108, and be joined to the sole structure 104 in a fixed manner using any suitable technique, such as through the use of an adhesive, by sewing, etc. The sole structure 104 may define the bottom surface of a void 109 for receiving and accommodating a user's foot, and the upper 102 may define the sides of the void 109.

At least a portion of the upper 102 may be formed with a knitted component 108 (or another suitable textile component). For example, the upper 102 may be formed primarily as an integral one-piece element during a knitting process, such as a weft knitting process (e.g., with a flat knitting machine or circular knitting machine), a warp knitting process, or any other suitable knitting process. That is, the knitting process on the knitting machine may substantially form the knit structure of the knitted components without the need for significant post-knitting processes or steps. Alternatively, the knitted component 108 may be formed separately as distinct integral one-piece elements and then the respective elements attached (e.g., via sewing).

Figure 3:
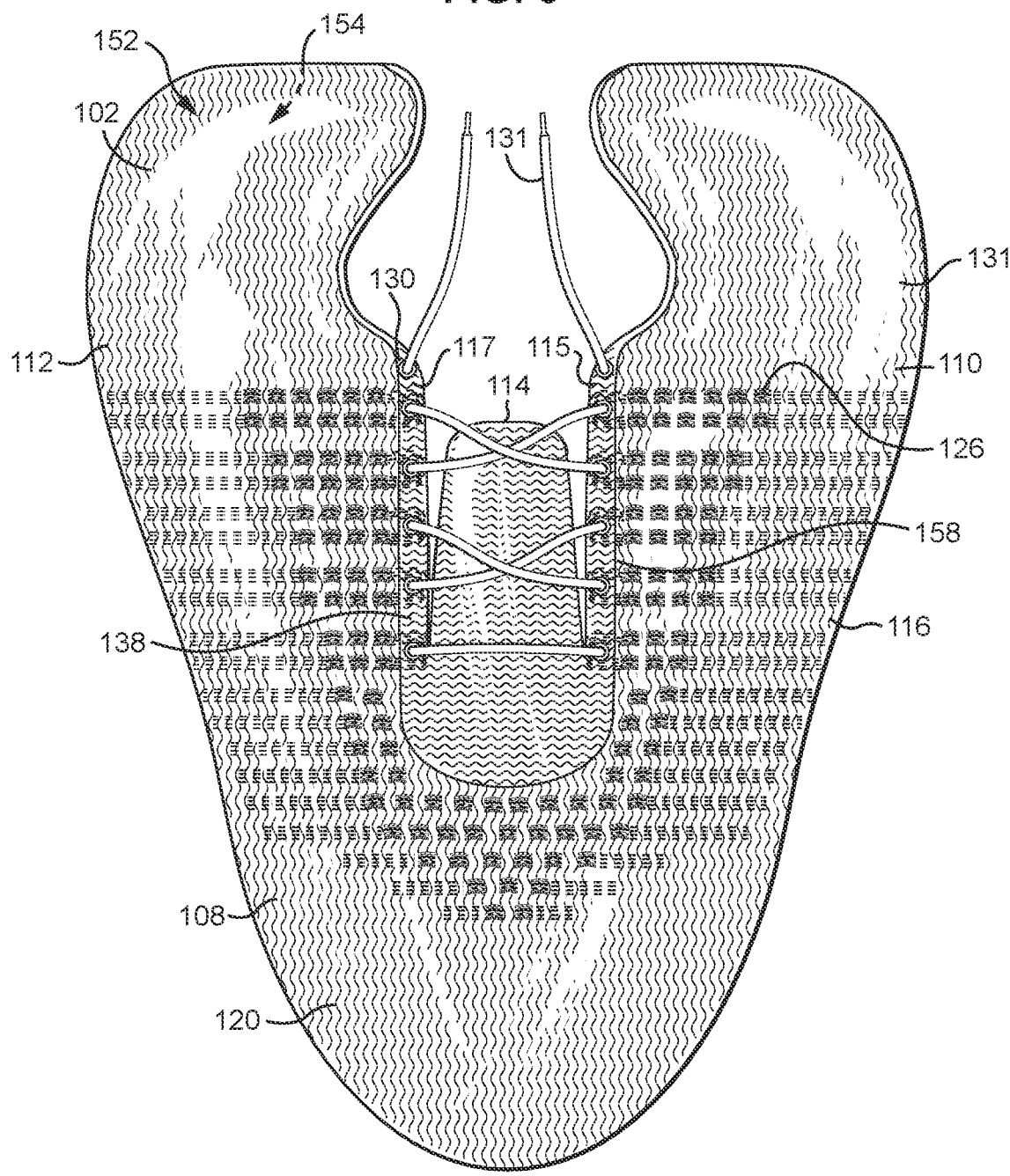
FIG. 3 is an illustration showing a knitted component forming an upper for the article of footwear of FIG. 1 in accordance with certain aspects of the present disclosure.

Referring to FIG. 3, which shows the knitted component 108 as it may appear after knitting but prior to being manipulated into a wearable shape to form the upper 102. The upper 102 may include a lateral side 110 and a medial side 112. A throat area 114 may be included between the lateral side 110 and the medial side 112, and the throat area 114 may be positioned to cover the top (dorsal) surface of the foot during typical use. The throat area 114 may include a lateral side 115 and a medial side 117. The lateral side 115 of the throat area 114 is disposed adjacent to the lateral side 110 of the upper 102 and the medial side 117 of the throat area 114 is disposed adjacent to the medial side 112 of the upper 102. A midfoot area 116 of the upper 102 may be located between a heel area 118 and a toe area 120. The throat area 114 may be primarily located in the midfoot area

116. In some embodiments, an optional tongue may be disposed at least partially in the throat area 114.

Forming the upper with a knitted component 108 may impart advantageous characteristics including, but not limited to, a particular degree of elasticity (for example, as expressed in terms of Young's modulus), breathability, bendability, strength, moisture absorption, weight, abrasion resistance, and/or a combination thereof. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a relatively inelastic material, or a relatively elastic material such as spandex), by selecting yarns of a particular size (e.g., denier), and/or a combination thereof. The weight of the upper 102, and thus the overall weight of the article of footwear 100, may be reduced with respect to alternative uppers and/or other components that are typically used in footwear. The knitted component 108 may also provide desirable aesthetic characteristics by incorporating yarns having different colors, textures or other visual properties arranged in a particular pattern. The yarns themselves and/or the knit structure formed by one or more of the yarns of the knitted components may be varied at different locations to provide different knit portions with different properties (e.g., a portion forming the throat area 114 of the knitted component 108 may be relatively elastic while a portion forming the heel area 118 or another area may be relatively inelastic, or vice versa).

In some embodiments, the knitted component 108 may incorporate one or more materials with properties that change in response to a stimulus (e.g., temperature, moisture, electrical current, magnetic field, or light). For example, the knitted component 108 may include yarns formed of a thermoplastic polymer material (e.g., a polyurethane, polyamide, polyolefin, and/or nylon) that transitions from a solid state to a softened or liquid state when subjected to certain temperatures at or above its melting point and then transitions back to the solid state when cooled. The thermoplastic polymer material may provide the ability to heat and then cool a portion of the knitted component 108 to thereby form an area of bonded or continuous material (herein referred to as a "fused area") that exhibits certain advantageous properties including a relatively high degree of rigidity, strength, and water resistance, for example.

At least one of the yarns incorporated into the knitted component 108 may be what is referred to as a "high-tenacity" yarn, which may be particularly advantageous when it is desired for the margins to exhibit enhanced strength. For example, as described in more detail below (and shown in certain following figures), the and second yarn 122 the third yarn 124 incorporated into the knitted component 108 may require enhanced strength relative to typically-used yarns to prevent yarn breakages during knitting. As used herein, "tenacity" is understood to refer to the amount of force (expressed in units of weight, for example: pounds, grams, centinewtons or other units) needed to rupture a yarn (i.e., the breaking force or breaking point of the yarn), divided by the linear mass density of the yarn expressed, for example, in (unstrained) denier, decitex, or some other measure of weight per unit length. The amount of force needed to break a yarn (the "breaking force" of the yarn) is determined by subjecting a sample of the yarn to a known amount of force by stretching the sample until it breaks, for example, by inserting each end of a sample of the yarn into the grips on the measuring arms of an extensometer, subjecting the sample to a stretching force, and measuring the force required to break the sample using a strain gauge load cell. Suitable testing systems can be obtained from Instron (Norwood, Mass., USA). Yarn tenacity and yarn breaking force are distinct from burst strength or bursting strength of a textile, which is a measure of the maximum force that can be applied to the surface of a textile before the surface bursts.

Generally, in order for a yarn to withstand the forces applied in an industrial knitting machine, the minimum tenacity required is approximately 1.5 grams per denier (g/D). Most synthetic polymer continuous filament yarns formed from commodity polymeric materials generally have tenacities in the range of about 1.5 g/D to about 4 g/D. The term "about" is specifically defined herein to include the specific value referenced as well as a dimension that is within 5% of the dimension both above and below the dimension. For example, polyester filament yarns that may be used in the manufacture of knit uppers for article of footwear have tenacities in the range of about 2.5 g/D to about 4 g/D. Filament yarns formed from commodity synthetic polymeric materials which are considered to have high tenacities (e.g., a "high tenacity yarn") generally have tenacities in the range of about 5 g/D to about 10 g/D. For example, commercially available package dyed polyethylene terephthalate filament yarn from National Spinning (Washington, N.C., USA) has a tenacity of about 6 g/D, and commercially available solution dyed polyethylene terephthalate filament yarn from Far Eastern New Century (Taipei, Taiwan) has a tenacity of about 7 g/D. Filament yarns formed from high performance synthetic polymer materials generally have tenacities of about 11 g/D or greater. For example, filament yarns formed of aramid typically have tenacities of about 20 g/D, and filament yarns formed of ultra-high molecular weight polyethylene (UHMWPE) having tenacities greater than 30 g/D are available from Dyneema (Stanley, N.C., USA) and Spectra (Honeywell-Spectra, Colonial Heights, Va., USA).

Herein, yarns referred to as "high tenacity yarns" are those having a tenacity of at least 5 g/D, such as at least 10 g/D, and such as at least 20 g/D in certain embodiments. High tenacity yarns may be selectively located in areas of the upper 102 where high-strength and high-durability is desirable. For example, referring to FIG. 4, the lateral side 115 of the throat area 114 and/or the medial side 117 of the throat area 114 (including a second area 126 that extends through at least one of the lateral side 115 and the medial side 117 of the throat area 114) may include a plurality of second knit courses 128 formed by at least one high tenacity yarn (e.g., the second yarn 122). Optionally, a majority of the second knit courses 128 in the lateral side 115 of the throat area 114 and/or the medial side 117 of the throat area 114 may include at least one high tenacity yarn (e.g., the second yarn 122), such as all of (or a majority of) the second knit courses 128 that are located adjacent to one or more lace loops 130. Further, to save on material costs and product weight, it is contemplated that the second knit courses 128 forming the lateral side 115 of the throat area 114 and/or the medial side 117 of the throat area 114 may substantially exclude other types of yarns (i.e., those that are not considered high tenacity yarns), but this is not required.

By contrast, the lateral side 110 and/or the medial side 112 of the upper 102 (e.g., located laterally and medially of the throat area 114, respectively, including a first area 132 located on at least one of the lateral side 110 and the medial side 112 of the upper 102) may be primarily formed by a different yarn type (although, in other embodiments, a high tenacity yarn may be primarily used). For example, referring to FIG. 3, the lateral side 110 and/or the medial side 112 of the upper 102 may include a plurality of first knit courses 134 that are at least partially formed by a first yarn 136. Optionally, a majority of the first knit courses 134 in the lateral side 110 and/or the medial side 112 of the upper 102 are at least partially formed by the first yarn 136. The plurality of first knit courses 134, when incorporated into an upper 102 of an article of footwear 100, may form an exterior surface 152 and an interior surface 154 (facing the void 109) of the upper 102.

The first yarn 136 may include a polyester material, a fusible material (e.g., a thermoplastic polymer material with a melting point suitable for post-knit heat processing), an elastic material (e.g., elastane), a recyclable material, and/or any other suitable material. The first yarn 136 and/or combination of yarns forming the lateral side 110 and/or the medial side 112 of the upper 102 (FIG. 3) may be selected to provide the lateral side 110 and/or the medial side 112 of the upper 102 with a suitable stretchability and/or softness to provide comfort, for example.

In some embodiments (still referring to FIG. 4), the first yarn 136 forming the first knit courses 134 of the lateral side 110 and/or the medial side 112 of the upper 102 may extend into the lateral side 115/medial side 117 of the throat area 114 (e.g., it may be advantageous for the first yarn 136 to only be secured at the edge(s) 158 of the lateral side 115/medial side 117 of the throat area 114 such that it is substantially excluded from the throat area 114), but this is not required. Likewise, the second yarn 122 (e.g., a high tenacity yarn) forming the second knit courses 128 of the lateral side 115 and/or medial side 117 of the throat area 114 may be substantially excluded from the areas outside the throat area 114, but this is not required. In some embodiments (e.g., if both yarn types are isolated in their respective areas), an intarsia method may be used, where each yarn type is devoted to its own feeder, and where the respective yarn types are only secured (e.g., looped) at the boundary between the throat area 114 and the surrounding areas. For example, an intarsia method may be used that is similar or identical to that described in U.S. patent application Ser. No. 16/397,138, filed Apr. 29, 2019, which is hereby incorporated by reference in its entirety.

The lateral side 115 and/or medial side 117 of the throat area 114 may include one or more features configured (e.g., sized, located, and shaped) to receive a lacing element 131 and/or otherwise engage a footwear fastening system (such as a shoelace as shown, a cable system, a strap, etc.). In the depicted example, for example, the lateral side 115 and the medial side 117 of the throat area 114 both include knit anchors 138, which in this instance include tubes or other suitable pathways between two lace loops 130 (e.g., for receipt of a shoelace). The knit anchors 138 may include one or more of the features described in U.S. patent application Ser. No. 16/534,702, filed on Aug. 7, 2019, which is hereby incorporated by reference in its entirety. For example, the knit anchors 138 may be formed by a tubular knitting process where a knit layer formed on a first needle bed of the knitting machine remains separable from (e.g., not locked to) a knit layer formed on a second needle bed for a plurality of courses (as described in more detail below). Thus, at least a portion of the lateral side 115 of the throat area 114 and/or the medial side 117 of the throat area 114 may include a two-layer structure formed by such tubular knitting, and it is contemplated that this two-layer structure (e.g., having a first layer and a second layer with a pocket therebetween) may extend along the throat area 114 at least the length where the lace loops 130 are located (and perhaps further). Alternatives are also contemplated (e.g., where the tubular knitting process is located to only certain knit anchors, and/or where a single layer knitting process is used along the throat area 114, etc.).

Figure 4:
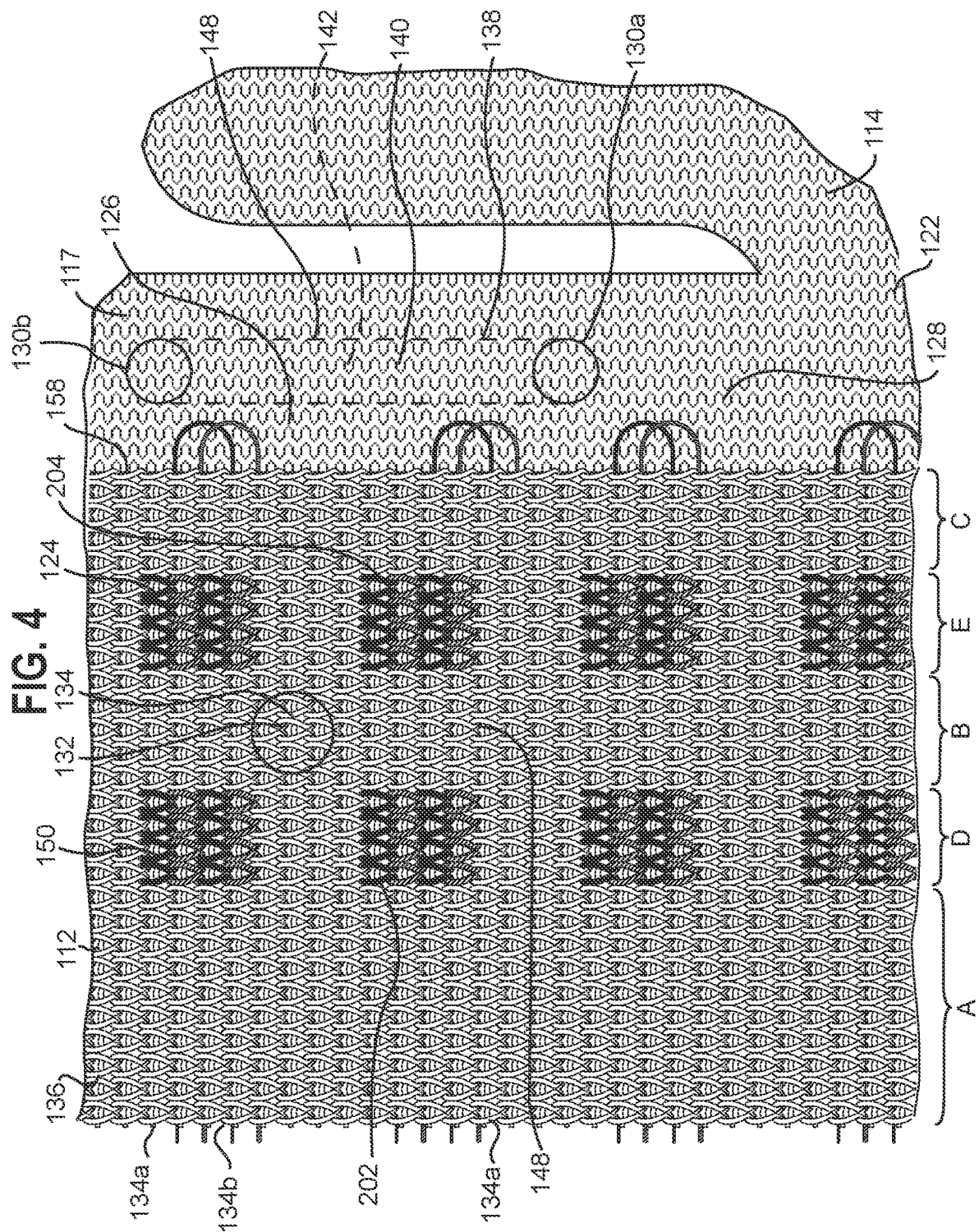
FIG. 4 is an illustration showing a portion of the knitted component of FIG. 3 in accordance with certain aspects of the present disclosure.

For example, referring to FIG. 4, (showing a close-up view of one knit anchor 138) a first layer 140 of the anchor 138, which may define the exterior surface 144 of the throat area 114, may be formed on a first needle bed (e.g., with a single-jersey or similar knit structure). A second layer 142 of the anchor 138 (located beneath the first layer 140 from the perspective of FIG. 4), which may define an inner surface 146 of the throat area 114, may be formed on a second needle bed of a knitting machine (e.g., with a single-jersey or similar knit structure). Optionally, the tubular knit structure may extend through the entirety (or the majority) of the lateral side 115 and/or the medial side 117 of the throat area 114 (e.g., formed by the second knit courses 128). In such an embodiment, a pocket 139 may be formed between the first layer 140 and the second layer 142 and extends longitudinally (e.g., the direction of the wales; toe-to-heel direction) along the throat area 114 on one or both of the lateral and medial sides 115 and 117 of the throat area 114.

Alternatively, the edges of the anchor 138 (which extend along the anchor's length) may be locations where a course at the end of the tubular knit structure (in the knitting direction) utilizes both needle beds, thus locking the first layer 140 and the second layer 142 together such that each anchor 138 is associated with its own separate pocket. In other embodiments, the knit anchor(s) 138 may simply be a hole/opening within one of the lateral side 115 and medial side 117 of the throat area 114 (e.g., a first opening 130a and a second opening 130b located in the first layer 140 of the lateral side 115 and/or the medial side 117 of the throat area 114), and the lateral side 115 and/or the medial side 117 of the throat area 114 may be formed without a pocket formed between layers as shown. The first and second openings 138a and 138b are configured to receive a fastening element 131, such as a shoelace as shown in FIG. 3).

To provide the lateral side 110 and/or the medial side 112 of the upper 102 with adequate strength and stretchability, one or more third yarns 124 may be included (and potentially knitted) in the lateral side 110 and/or the medial side 112 of the upper 102, extending from the biteline 106 of the upper 102 to the lateral side 115 and/or the medial side 117 of the throat area 114. The third yarn 124 may be a high tenacity yarn or a P16 yarn (e.g., a polyester yarn), and it is contemplated that the third yarn 124 may be a yarn that is the same or similar to the above-described second yarn 122. In FIG. 4, the third yarn 124 includes a first knitted area 202 and a second knitted area 204 (and more or fewer knitted areas may be alternatively included). As shown, the first knitted area 202 and the second knitted area 204 each include four consecutive knitted loops 206, but other configurations are alternatively contemplated. For example, the first knitted area 202 and/or the second knitted area 204 may include any suitable number of loops, such as at least four consecutive or alternating loops but less than twenty consecutive or alternating loops (e.g., to optimize and/or customize the overall stretchability of the medial side 112 of the upper 102). The size and location of the knitted areas 202 may have a particularly prominent effect on certain features of the medial side 112 of the upper 102 when the third yarn(s) 124 have a characteristic that is substantially different than the first yarns 136. For example, when the third yarns 124 are high tenacity yarns but the first yarns 136 are not, the size and structure of the knitted areas 202, 204 may provide adequate and suitable stretchability, strength, and durability characteristics.

Figure 5:
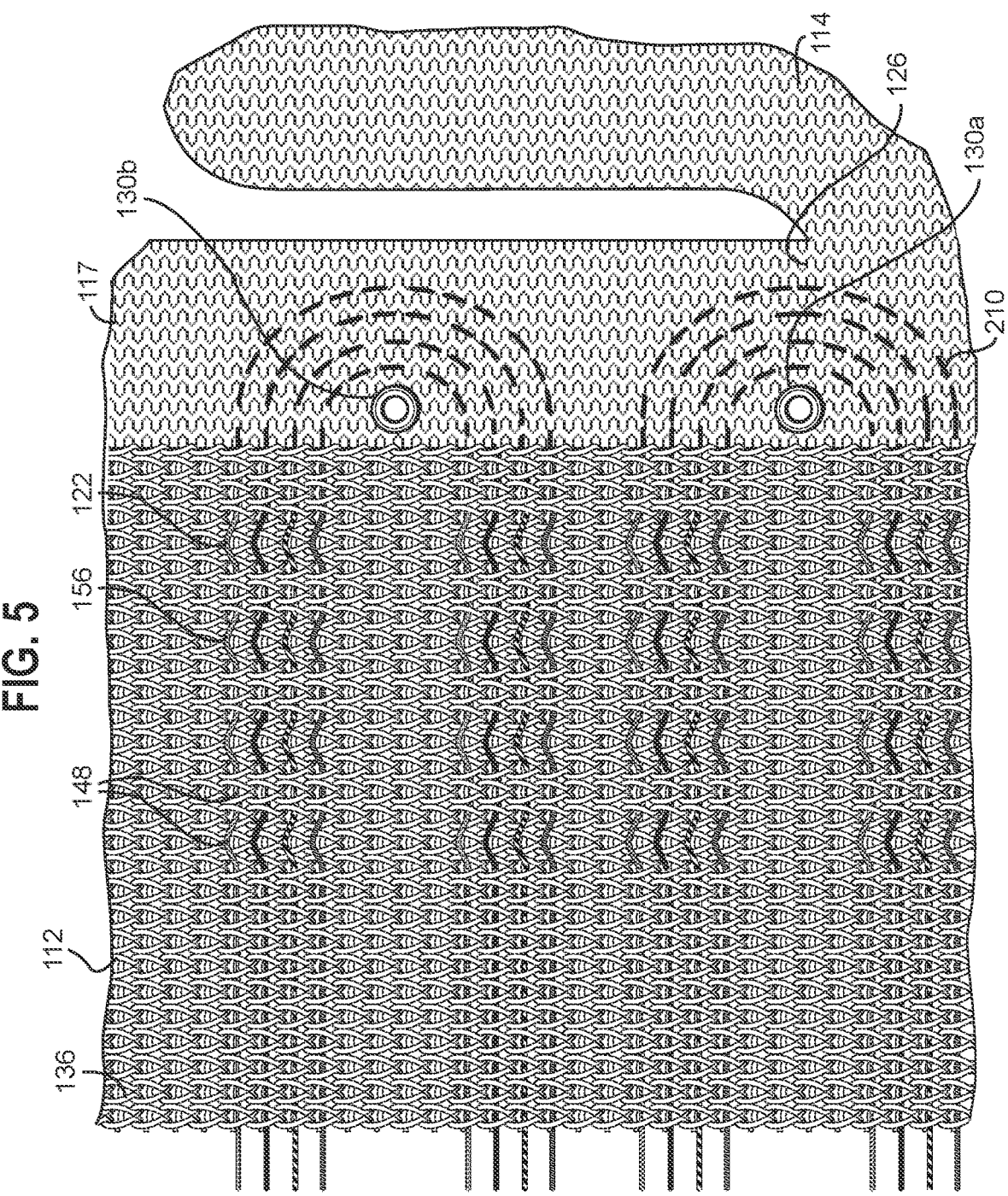
FIG. 5 is an illustration showing a portion of another embodiment of a knitted component forming an upper for an article of footwear having a stretch resistance system in accordance with certain aspects of the present disclosure.
Figure 6:
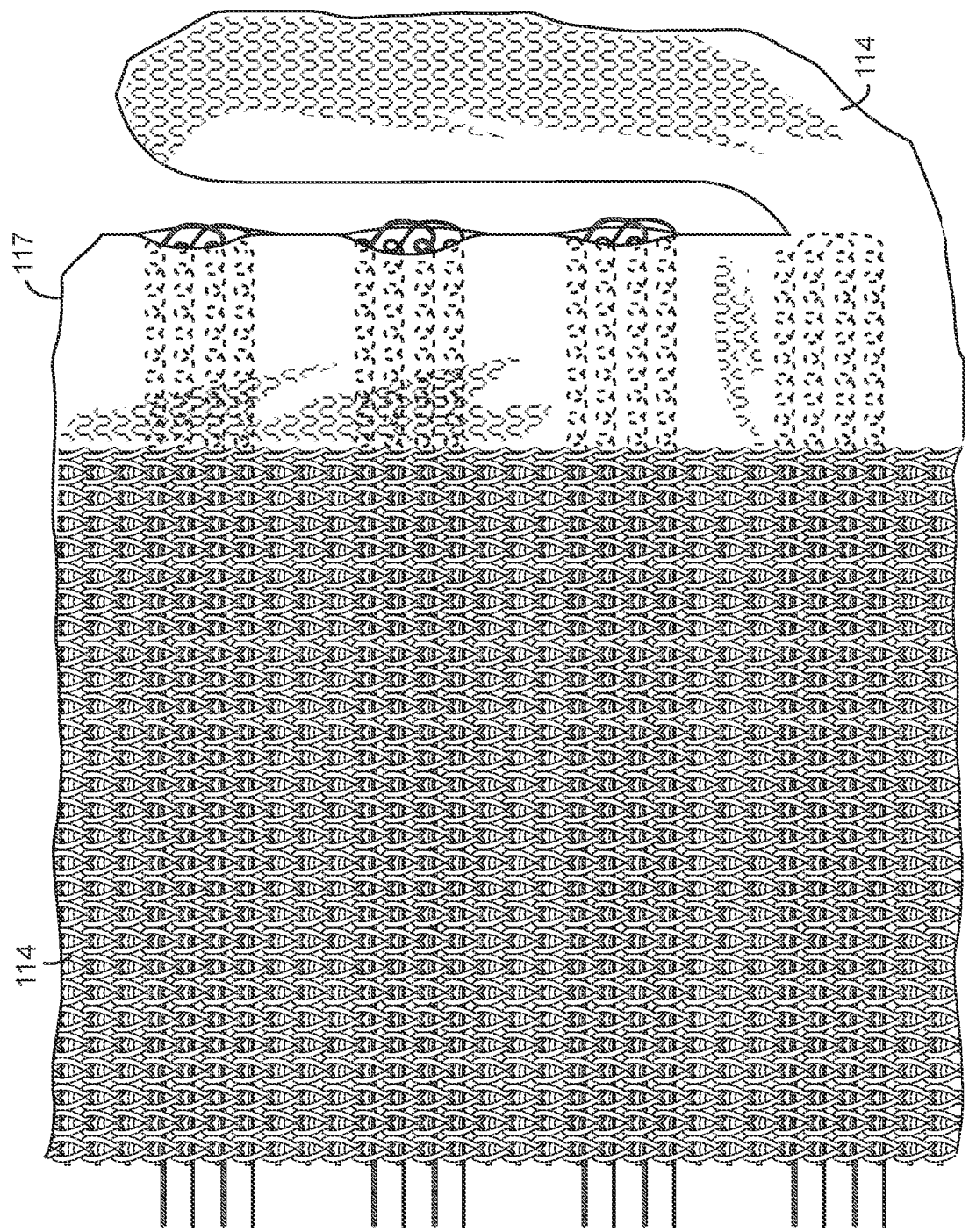
FIG. 6 is an illustration showing a portion of another embodiment of a knitted component forming an upper for an article of footwear having a stretch resistance system in accordance with certain aspects of the present disclosure.

As shown, the third yarns 124 may include at least one floating portion 148 extending through at least one of the first knit courses 134 in the lateral side 110 and/or the medial side 112 of the upper 102 (and potentially providing a high-tenacity connection between the different knitted areas of high tenacity yarns, such as the first knitted area 202 and the second knitted area 204). The floating portion(s) 148 of the third yarn 124 that extend through the first knit course(s) 134 may span or extend along many wales of the knitted component 108. "Wales" as used in this Detailed Description refers to the columns of loops that may extend along multiple courses. Wales extend perpendicular to the knitting direction. "Courses" refers to rows of loops formed from a yarn that extend along the knitting direction. In other words, a floating portion 148 may extend over multiple needles of a knitting machine which may or may not be holding loops. The distance that a floating portion 148 extends through the knitted component 108 may be referred to in terms of number of wales of the knitted component 108. Multiple third yarns 124 may extend through adjacent courses (e.g., consecutive courses as shown in FIGS. 4-6) or nonadjacent courses of the first knit courses 134. In some embodiments, the floating portion 148 of the third yarn 124 (e.g., a high tenacity yarn) may extend along a first course 134*a* passing multiple wales or needles while not interacting with loops of the first course 134*a*. For example, as shown in FIG. 4, in section A, the floating portion 148 extends past ten wales, in section B, the floating portion 148 extends past 5 wales, and in section C, the floating portion 148 extends past 5 wales.

By varying the length of floating portion 148 (e.g., the number of wales the floating portion extends past), desired stretch resistance may be achieved. A floating portion 148 that extends past a greater number of wales provide greater stretch resistance than a floating portion 148 that extends a fewer number of wales (i.e., since floating yarns lack the inherent stretch in a knitted loop). For example, a floating portion 148 that extends past twenty-seven wales (e.g., as shown in FIG. 5) may provide greater stretch resistance than a floating portion 148 that extends past 10 wales (e.g., as shown in FIG. 4) due to the inherent stretchability of intervening knitted areas (e.g., as shown in FIG. 4, areas 202 and 204). Also, a floating portion 148 that extends past a greater number of wales may provide stretch resistance over a greater portion of the knitted component 108. In some embodiments, as shown in FIG. 4, the floating portion 148 may extend over a portion of the knitted component 108 (e.g., extend partially over the lateral 110 and/or medial 112 side of the upper 102). In some embodiments, as shown in FIG. 5, the floating portion 148 may extend from the biteline 106 to the throat area 114 (and thus provide stretch resistance along a length of the floating portion 148 between the biteline 106 and the throat area 114). Thus, the length of the floating portions 148 may be adjusted for a particular stretch-resistant property in a particular area within an article of footwear 100.

As discussed above, in some embodiments, the third yarn 124 may include at least one interlooped portion 150 (e.g., defining the knitted areas 202 and 204) that interloops with loops of an adjacent course of the first knit courses 134. For example, as shown in FIG. 4, in sections D, and E, the third yarn 124 includes two interlooped portions 150. Each interlooped portion 150 includes three loops that respectively interloop with three loops of a second course 134*b* (e.g., adjacent to and intermeshed with the first course 134*a* of the first knit courses 134). In this embodiment, in sections D and E, the loops of the interlooped portion 150 and the loops of the second course 134*b* collectively form a course of the first knit courses 134, and the loops of the interlooped portion 150 are exposed on the exterior surface 152 of the upper 102. The interlooped portions 150 (e.g., as shown in section F in FIG. 4) may help secure the adjacent floating portions 148 (e.g., as shown in sections B and C in FIG. 4) to the knitted component 108.

Interlooped portions 150 may provide more stretchability than the floating portions 148 due to the loops formed in the interlooped portions 150. Interlooped portions with a greater length may provide stretchability over a greater portion of the knitted component 108. By selectively incorporating the floating portions 148 and the interlooped portions 150 at desired locations along a length of a third yarn 124, various stretch resistance may be provided along the length of the third yarn 124. For example, as shown in FIG. 4, the third yarn 124 includes floating portions in sections A, B, and C that are continuous with interlooped portions 150 in sections D and E. The length, number, and location of the floating portions 148 and the interlooped portions 150 may be varied, as desired and/or needed, to achieve desired stretch resistance along the length of the third yarn 124 without departing from the scope of the present disclosure. Additionally, it is contemplated that the loops of the third yarn 124 may provide desirable aesthetics, particularly where the third yarn 124 is a different color (or has another varying visual characteristic) relative to the adjacent yarns in the knitted component.

In some embodiments, the third yarn 124 may include at least one exposed portion 156 that does not interloop with adjacent first knit courses 134 but extend over the exterior surface 152 of the upper 102. For example, as shown in FIG. 5, the third yarn 124 includes four exposed portions 156 that are spaced along the length of the third yarn 124. Each exposed portion 156 includes two ends that extend from the exterior surface 152 to the interior surface 154 of the upper 102 through respective loops of the first course 134*a* of the first knit courses 134. The length of each exposed portion 156 may be varied by selectively extending the two ends of the exposed portion 156 through respective loops of a course of the first knit courses 134 that are spaced apart a desired distance. To prevent the exposed portions 156 from being snagged or caught on an external item, the exposed portions 156 are configured to at least partially contact the exterior surface 152 without visible gap therebetween. The exposed portions 156 provide a degree of stretch resistance between the floating portions 148 and the interlooped portions 150.

Various combinations of the floating portions 148, interlooped portions 150, and exposed portions 156 may be selectively incorporated into the knitted component 108 to achieve desired properties of stretch resistance in particular locations of an upper 102. Floating portions 148 may be utilized to enhance the strength of desired areas of the upper 102 and counteract the elevated forces that these areas of the upper 102 may experience during use of the article of footwear 100. In addition, by utilizing the floating portions 148 at desired areas of the upper 102, a wear's foot may be comfortably restricted from movement within the article of footwear 100, securing the foot in relation to the sole structure 104. This is advantageous for allowing the upper 102 to be formed primarily from very elastic materials (e.g., recyclable materials) with desired strength provided in particular locations as needed, and thus costs may be reduced. For example, as shown in FIG. 5, the floating portions 148 extend in the general direction from the biteline 106 to the throat area 114 in the midfoot area of the upper 102, which provide desired strength in these locations and help secure the foot in the article of footwear 100 (e.g., in the midfoot area 116, especially when the first knit courses 134 are formed from very elastic materials, such as recyclable materials).

As discussed above, by varying the combination of the floating portions 148, interlooped portions 150, and exposed portions 156, the third yarn 124 may impart different stretch resistance in different regions along a length of a course of the first knit courses 134. This is advantageous for allowing additional strength (provided by the floating portions 148) to be selectively provided at spaced apart locations and even any locations, as desired and/or needed, during a continuous knitting process, without the need for significant post-knitting processes or steps.

The knitted component 108 with a desired combination of the floating portions 148, interlooped portions 150, and exposed portions 156 may be used to counteract typical forces that may be exerted throughout the upper 102 during use. Typical forces are forces that may occur in an article of footwear 100 that is used for a particular purpose, for example, an article of footwear 100 configured for a sport or other athletic activity. The typical motions for a player or participant of a sport or athletic activity cause force to be exerted on an upper 102 of the article of footwear 100 in certain areas. Typical forces may be forces that extend through an article of footwear 100 as a foot presses against the upper 102. The foot may stretch or deform the upper 102 as the foot extends into the upper 102. By placing large floating portions 148 in particular locations in the knitted component 108 incorporated into the upper 102, the floating portions 148 may be used to counteract the forces from a foot and assist with securing the foot within the article of footwear 100 and resist deformation of the upper 102.

Additionally, the floating portions may direct or distribute forces such that the stretch of the upper 102 may be limited in areas incorporating this structure. As depicted, the area of the upper 102 as shown in FIG. 5 may form a less elastic structure than the areas of the upper 102 as shown in FIGS. 4 and 6. The foot may press against the interior surface 154, and the area shown in FIG. 5 may better hold its shape than the areas shown in FIGS. 4 and 6 when subjected to a similar force. The floating portions 148 may limit the stretch of the upper 102 and create channels or paths for the force to run along. The floating portions 148 therefore may accept or direct the forces, thereby reducing the amount of force that may act upon other courses of the knitted component 108 of the upper 102. For example, as shown in FIG. 5, the force exerted to the lateral side 115 and/or the medial side 117 of the throat area 114 by a wearer's foot may be distributed by the floating portions 148 along the length of the floating portions 148 to the biteline 106. Thus, the use of floating portions 148 may allow for better stability and control in corresponding areas of the upper 102, increase performance and durability, as well as increase a user's comfort and feel.

The third yarn 124 may extend into the throat area in various ways (e.g., as shown in FIGS. 4-6). Any of the various ways of extending the third yarn 124 inside the pocket 139 and any combination thereof may be selectively included in the knitted component 108. In some embodiments, as shown in FIG. 4, the third yarn 124 extends through a first course 134a of the first knit courses 134 from the biteline 106 to the edge 158 between the first area 132 and the second area 126, extends over the edge 158 into the pocket 139 in the second area 126 for a predetermined length (e.g., a very short distance without interlooping with any of the second knit courses 128 in the second area 126), and then extends back into the first area 132 through another course of the first knit courses 134 (e.g., a second course 134b, which may or may not adjacent to the first course 134a) to the biteline 106.

In some embodiments, as shown in FIG. 5, the third yarn 124 extends around a first opening 130a and back into the first area 132. More than one course of the third yarn 124 may extend around the same first opening 138a in the second area 126. For example, as shown in FIG. 5, four of the third yarns 124 have this feature. The portions of the third yarn 124 that are in the second area 126 may remain unexposed from an outer surface of the upper 102, particularly when the second area 126 includes a tubular knit construction with an outer knit layer and an inner knit layer, as discussed above. For example, the depicted portions 210 of the third yarn 124 may remain within the pocket of the tubular area of knitting. Advantageously, this may prevent the portions 210 of the third yarn 124 from snagging or otherwise interfering with an elements beyond the exterior surface of the upper.

As shown, the portions 210 may at least partially wrap around at least one opening 130a (and/or other openings). This may be particularly advantageous where the opening 130a is configured to receive a shoelace or other fastening element for an article of footwear, as the forces exerted on the opening 130a may be transferred through the third yarn 124 to a different area of the article of footwear (e.g., the sole structure).

In some embodiments, as shown in FIG. 6, the third yarn may extend into the second area 126, and may form loops 208 in the second area 126 (perhaps in combination with another yarn, such as the second yarn 122 discussed above). Such an embodiment may be advantageous for its simplicity of manufacturing on a conventional kitting machine, and it may provide a superior (e.g., very strong and durable) connection between the first area 132 and the second area 126 since the third yarns 124 form loops in both areas (e.g. with continuous segments of yarn between said loops).

The subject-matter of the disclosure may also relate, among others, to the following aspects:

A 1st aspect relates to an upper for an article of footwear. The upper may include a first area located on at least one of a lateral and a medial side of the upper, where the first area comprises a plurality of first knit courses, and where at least a majority of the first knit courses are at least partially formed by a first yarn. The upper may further include a second area located adjacent to the first area of the upper, where the second area extends through at least one of a lateral side and a medial side of a throat area of the upper, where the second area comprises a plurality of second knit courses, and where at least a majority of the second knit courses are formed by a second yarn. The second yarn may have a tenacity of at least 5 g/D.

A 2nd aspect relates to the preceding aspect, where a third yarn extends from a biteline of the upper to the second area, and where the third yarn includes at least one floating portion extending through at least one of the first knit courses in the first area.

A 3rd aspect relates to the aspect 2, where the third yarn includes a polyester material.

A 4th aspect relates to aspect 2 or 3, where the third yarn has a tenacity of at least 5 g/D.

A 5th aspect relates to any of the preceding aspects, where the first yarn consists of a polyethylene terephthalate (PET) material.

A 6th aspect relates to the any of the preceding aspects, where the second area comprises a two-layer construction formed by the second knit courses, and where a pocket is located between a first layer and a second layer.

A 7th aspect relates to the aspect 6, where a first opening and a second opening located in the first layer of the second area, and where the first opening and the second opening are configured to receive a fastening element.

An 8th aspect relates to any of the preceding aspects, where a third yarn is included that forms at least one loop within a first knit course of the plurality of first knit courses, and where the second area includes a first layer and a second layer, where a pocket is located between the first layer and the second layer, and where the third yarn extends inside the pocket.

A 9th aspect relates to aspect 8, where the at least one loop is exposed on an exterior surface of the upper.

A 10th aspect relates to any of the preceding aspects, where the second yarn is substantially excluded from the first area.

An 11th aspect relates to an upper for an article of footwear, comprising: a first area located on at least one of a lateral and a medial side of the upper, where the first area comprises a plurality of first knit courses, and where at least a majority of the first knit courses are at least partially formed by a first yarn; and a second area located adjacent to the first area of the upper, where the second area extends through at least one of a lateral side and a medial side of a throat area of the upper, where the second area comprises a plurality of second knit courses, and where at least a majority of the second knit courses are formed by a second yarn, where the second yarn has a tenacity of at least 5 g/D, and where the first yarn has a tenacity of less than 5 g/D.

A 12th aspect relates to aspect 11, where the second yarn includes a polyethylene terephthalate (PET) material.

A 13th aspect relates to any of aspects 11-12, where the second area comprises a two-layer construction formed by the second knit courses, and where a pocket is located between a first layer and a second layer.

A 14th aspect relates to aspect 13, where a first opening and a second opening are located in the first layer of the second area, and where the first opening and the second opening are configured to receive a fastening element.

A 15th aspect relates to any of aspects 11-14, where a third yarn extends from a biteline of the upper to the second area, and where the third yarn includes at least one floating portion extending through at least one of the first knit courses in the first area.

A 16th aspect relates to aspect 15, where the second area includes a first layer and a second layer, where a pocket is located between the first layer and the second layer, and where the third yarn extends inside the pocket.

A 17th aspect relates to any of aspects 15-16, where the third yarn includes a polyester material.

An 18th aspect relates to any of aspects 15-17, where the third yarn has a tenacity of at least 5 g/D.

A 19th aspect relates to an upper for an article of footwear, comprising: a first area located on at least one of a lateral and a medial side of the upper, where the first area comprises a plurality of first knit courses, and where at least a majority of the first knit courses are at least partially formed by a first yarn, and where the first area include a single-layer construction; and a second area located adjacent to the first area of the upper, where the second area extends through at least one of a lateral side and a medial side of a throat area of the upper, where the second area comprises a plurality of second knit courses, and where at least a majority of the second knit courses are formed by a second yarn, where the second area comprises a two-layer construction formed by the second knit courses, and where a pocket is located between a first layer and a second layer.

A 20th aspect relates to aspect 19, where a first opening and a second opening located in the first layer of the second area, and where the first opening and the second opening are configured to receive a fastening element.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

We claim:

1. An upper for an article of footwear, comprising:
a first area located on at least one of a lateral and a medial side of the upper, wherein the first area comprises a plurality of first knit courses, and wherein at least a majority of the plurality of first knit courses are at least partially formed by a first yarn; and
a second area located adjacent to the first area of the upper, wherein the second area extends through at least one of a lateral side and a medial side of a throat area of the upper, wherein the second area comprises a plurality of second knit courses, and wherein at least a majority of the plurality of second knit courses are formed by a second yarn,
wherein the second yarn has a tenacity of at least 5 g/D, and
wherein a third yarn is included that forms at least one loop within a first knit course of the plurality of first knit courses, and wherein the second area includes a first layer and a second layer, wherein a pocket is located between the first layer and the second layer, and wherein the third yarn extends inside the pocket.

2. The upper of claim 1, wherein the third yarn extends from a biteline of the upper to the second area, and wherein the third yarn includes at least one floating portion extending through at least one of the plurality of first knit courses in the first area.

3. The upper of claim 2, wherein the third yarn includes a polyester material.

4. The upper of claim 2, wherein the third yarn has a tenacity of at least 5 g/D.

5. The upper of claim 1, wherein the first yarn consists of a polyethylene terephthalate (PET) material.

6. The upper of claim 1, wherein a first opening and a second opening are located in the first layer of the second area, and wherein the first opening and the second opening are configured to receive a fastening element.

7. The upper of claim 1, wherein the at least one loop is exposed on an exterior surface of the upper.

8. The upper of claim 1, wherein the second yarn is substantially excluded from the first area.

9. An upper for an article of footwear, comprising:
a first area located on at least one of a lateral and a medial side of the upper, wherein the first area comprises a plurality of first knit courses, and wherein at least a majority of the plurality of first knit courses are at least partially formed by a first yarn; and a second area located adjacent to the first area of the upper, wherein the second area extends through at least one of a lateral side and a medial side of a throat area of the upper, wherein the second area comprises a plurality of second knit courses, and wherein at least a majority of the plurality of second knit courses are formed by a second yarn, wherein the second yarn has a tenacity of at least 5 g/D, wherein the first yarn has a tenacity of less than 5 g/D, and wherein the first area extends between the second area and a biteline of the article of footwear.

10. The upper of claim 9, wherein the second yarn includes a polyethylene terephthalate (PET) material.

11. The upper of claim 9, wherein the second area comprises a two-layer construction formed by the plurality of second knit courses, and where a pocket is located between a first layer and a second layer.

12. The upper of claim 11, wherein a first opening and a second opening are located in the first layer of the second area, and wherein the first opening and the second opening are configured to receive a fastening element.

13. The upper of claim 9, wherein a third yarn extends from the biteline of the upper to the second area, and wherein the third yarn includes at least one floating portion extending through at least one of the plurality of first knit courses in the first area.

14. The upper of claim 13, wherein the second area includes a first layer and a second layer, wherein a pocket is located between the first layer and the second layer, and wherein the third yarn extends inside the pocket.

15. The upper of claim 13, wherein the third yarn includes a polyester material.

16. The upper of claim 13, wherein the third yarn has a tenacity of at least 5 g/D.

17. An upper for an article of footwear, comprising:
a first area located on at least one of a lateral and a medial side of the upper, wherein the first area comprises a plurality of first knit courses, and wherein at least a majority of the plurality of first knit courses are at least partially formed by a first yarn, and wherein the first area include a single-layer construction; and
a second area located adjacent to the first area of the upper, wherein the second area extends through at least one of a lateral side and a medial side of a throat area of the upper, wherein the second area comprises a plurality of second knit courses, and wherein at least a majority of the plurality of second knit courses are formed by a second yarn,
wherein the second area comprises a two-layer construction formed by the plurality of second knit courses, and where a pocket is located between a first layer and a second layer, and
wherein the first area extends between the second area and a biteline of the article of footwear.

18. The upper of claim 17, wherein a first opening and a second opening located in the first layer of the second area, and wherein the first opening and the second opening are configured to receive a fastening element.

19. The upper of claim 9, wherein a third yarn extends from the biteline of the upper to the second area, wherein the third yarn forms at least one loop within a first knit course of the plurality of first knit courses, wherein the at least one loop within the first knit course of the plurality of first knit courses is exposed on an exterior surface of the upper, and wherein the third yarn forms at least one loop within a first knit course of the plurality of second knit courses in the second area.

20. The upper of claim 16, wherein the third yarn extends into the second area and forms at least one loop within the plurality of second knit courses in the second area.

* * * * *